US010214127B2

(12) United States Patent
Wegenka et al.

(10) Patent No.: US 10,214,127 B2
(45) Date of Patent: *Feb. 26, 2019

(54) PASSENGER SEAT (71) Applicant: Zodiac Seats US LLC, Gainesville, TX (US)

(72) Inventors: Jeffrey P. Wegenka, Denton, TX (US); Allen Shirey, Whitesboro, TX (US); Aram Krikorian, Ladera Ranch, CA (US)

(73) Assignee: Safran Seats USA LLC, Gainesville, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,622

(22) Filed: May 17, 2017

(65) Prior Publication Data
US 2017/0246972 A1  Aug. 31, 2017

Related U.S. Application Data (63) Continuation of application No. 14/372,553, filed as application No. PCT/US2013/021936 on Jan. 17, 2013, now Pat. No. 9,682,643.
(Continued)

(51) Int. Cl.
*B60N 2/68* (2006.01)
*B64D 11/06* (2006.01)
(Continued)

(52) U.S. Cl.
CPC .............. *B60N 2/686* (2013.01); *B60N 2/20* (2013.01); *B60N 2/242* (2013.01); *B60N 2/42* (2013.01);
(Continued)

(58) Field of Classification Search
CPC .......... B60N 2/686; B60N 2/20; B60N 2/242; B60N 2/42; B60N 3/004; B64D 11/0624;
(Continued)

(56) References Cited

U.S. PATENT DOCUMENTS 5,338,090 A    8/1994  Simpson
5,485,976 A    1/1996  Creed
(Continued)

FOREIGN PATENT DOCUMENTS

WO    2009012294    1/2009

OTHER PUBLICATIONS

International Application No. PCT/US2013/021936, Search Report and Written Opinion dated Apr. 5, 2013.
(Continued)

*Primary Examiner* — Philip F Gabler
(74) *Attorney, Agent, or Firm* — Kilpatrick Townsend & Stockton LLP; Dean W. Russell; Anthony L. Guebert (57) ABSTRACT Described are passenger seat assemblies including spreaders with a transitional region having a forward surface with a radius of curvature of about 3.5 to 3.7 inches and an aft surface with an angular profile configured so that the aft surface is located forward of a plane formed by a surface of the at least one seat back in a fully upright position. The passenger seat assemblies also include leg assemblies with a forward leg portion having a forward surface that is substantially aligned with a forward base frame tube, and an aft surface with an angular profile having a shape of an "r."

20 Claims, 10 Drawing Sheets

Related U.S. Application Data (60) Provisional application No. 61/635,366, filed on Apr. 19, 2012, provisional application No. 61/587,224, filed on Jan. 17, 2012.

(51) Int. Cl.

| | | |
|---|---|---|
| *B60N 2/24* | (2006.01) | |
| *B60N 2/42* | (2006.01) | |
| *B60N 2/20* | (2006.01) | |
| *B60N 3/00* | (2006.01) | |
| *B60R 7/04* | (2006.01) | |

(52) U.S. Cl.
CPC .............. *B60N 3/004* (2013.01); *B60R 7/043* (2013.01); *B64D 11/06* (2013.01); *B64D 11/064* (2014.12); *B64D 11/0624* (2014.12); *B64D 11/0638* (2014.12); *B64D 11/0646* (2014.12); *B64D 11/0648* (2014.12); *B64D 11/0696* (2013.01)

(58) Field of Classification Search
CPC .............. B64D 11/0638; B64D 11/064; B64D 11/0646; B64D 11/06; B64D 11/0696; B60R 7/043
See application file for complete search history.

(56) References Cited

U.S. PATENT DOCUMENTS

| | | |
|---|---|---|
| 5,657,950 A | 8/1997 | Han |
| 5,730,492 A | 3/1998 | Warrick |
| 5,743,592 A | 4/1998 | Bedouch |
| 6,565,151 B2 | 5/2003 | Jarnail |
| 7,077,467 B2 | 7/2006 | Wenzler |
| 9,682,643 B2 * | 6/2017 | Wegenka ............... B60N 2/242 |
| 2003/0094840 A1 | 5/2003 | Williamson |

OTHER PUBLICATIONS

International Application No. PCT/US2013/021936, International Preliminary Report on Patentability dated Jul. 31, 2014.

U.S. Appl. No. 14/372,553, Non-Final Rejection dated Nov. 5, 2015.

U.S. Appl. No. 14/372,553, Final Rejection dated May 13, 2016.

U.S. Appl. No. 14/372,553, Non-Final Rejection dated Sep. 22, 2016.

U.S. Appl. No. 14/372,553, Notice of Allowance dated Feb. 22, 2017.

* cited by examiner

PASSENGER SEAT

CROSS REFERENCE TO RELATED APPLICATIONS

This application is a continuation of U.S. Nonprovisional application Ser. No. 14/372,553 ("the '553 application"), which application is the U.S. national stage entry of PCT/US2013/021936 ("the '936 application"), filed on Jan. 17, 2013, which application is related to and claims priority benefits from U.S. Provisional Application Ser. No. 61/587,224, filed on Jan. 17, 2012, entitled Z100 PASSENGER SEAT ("the '224 application"), and U.S. Provisional Application Ser. No. 61/635,366, filed on Apr. 19, 2012, entitled Z100 PASSENGER SEAT (3) ("the '366 application"). The '553, '936, '224 and '366 applications are hereby incorporated herein in their entireties by this reference.

FIELD OF THE INVENTION

The invention relates to passenger seats or the like.

BACKGROUND

Common carriers, such as passenger airlines, bus lines, train lines, and passenger vehicles frequently convey substantial numbers of passengers simultaneously. In many instances, the number of seats within a given space may limit the amount space available for each passenger to such a degree that passengers have very little personal space. For example, a passenger's personal space between the passenger's knees and the passenger seat located forward of that passenger may be diminished by a reclining seat back of the next-forward passenger seat and/or by the shape of an aft surface the passenger seat below the reclining seat back.

In order to provide as much room as possible for the passenger's knees in the diminished space, some passenger seats have been modified so that the seat backs do not recline. The reclining seat back has traditionally impeded into the passenger's knee space because seat backs traditionally pivot near the bottom seat cushion (as indicated by reference number 110 in FIG. 4). While this option may ensure that the passenger's knee space is preserved, the passenger's reclining comfort has been sacrificed.

Furthermore, in many cases, the passenger seat comprises leg assemblies that are configured to require a substantial amount of space below the passenger seat, thus minimizing the amount of space available for a passenger's feet and/or baggage.

Thus, it may be desirable to provide a passenger seat assembly that provides a passenger with as much space as possible for a passenger's knees, feet, and/or baggage, while still allowing the passenger some reclining and/or sitting comfort.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include passenger seat assembly comprising at least two spreaders, each spreader comprising an upper portion and a lower portion separated by a transitional region, at least one seat back comprising a central panel and a pair of extensions coupled to a lower end of the central panel, wherein the pair of extensions are pivotally coupled the upper portions of the at least two spreaders, a base structure comprising a forward base frame tube and an aft base frame tube, wherein the forward base frame tube and the aft base frame tube are coupled to the lower portions of the at least two spreaders, and at least two leg assemblies, each leg assembly comprising a forward leg portion coupled to the forward base frame tube and the aft base frame tube.

In some embodiments, the transitional region of each spreader further comprises a forward surface having a radius of curvature of about 3.5-3.7 inches and an aft surface having an angular profile configured so that the aft surface is located forward of a plane formed by a surface of the at least one seat back in a fully upright position.

In other embodiments, a forward surface of the forward leg portion may be substantially aligned with a forward edge of the forward base frame tube, and an aft surface of the forward leg portion comprises an angular profile having a shape of an "r."

In yet other embodiments, the forward base frame tube may be located at a lower height than the aft base frame tube so that an upper end of the forward leg portion has a downward pitch in a forward direction between the aft base frame tube and the forward base frame tube.

At least two arm rests may be coupled to the upper portions of the at least two spreaders, wherein the seat back is configured to pivot relative to the spreaders adjacent the location where the at least two arm rests are coupled to the upper portions.

Certain embodiments of the leg assembly further comprise a load-limiting strut.

At least one seat pan may be coupled to the forward base frame tube and the aft base frame tube, wherein the at least one seat pan may comprise a deep contour located between the at least two spreaders and/or a door that provides access to an In-Flight Entertainment equipment stowed below the at least one seat pan.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide passenger seat assemblies. While the passenger seat assemblies are discussed for use with aircraft seats, they are by no means so limited. Rather, embodiments of the passenger seat assemblies may be used in passenger seats or other seats of any type or otherwise as desired.

FIGS. 1-10 illustrate embodiments of a passenger seat assembly 10. The passenger seat assembly 10 comprises at least one seat back 12, at least one seat pan 14, at least two arm rests 16, at least two spreaders 18, a base structure 20, and at least two leg assemblies 22.

Figure 3:
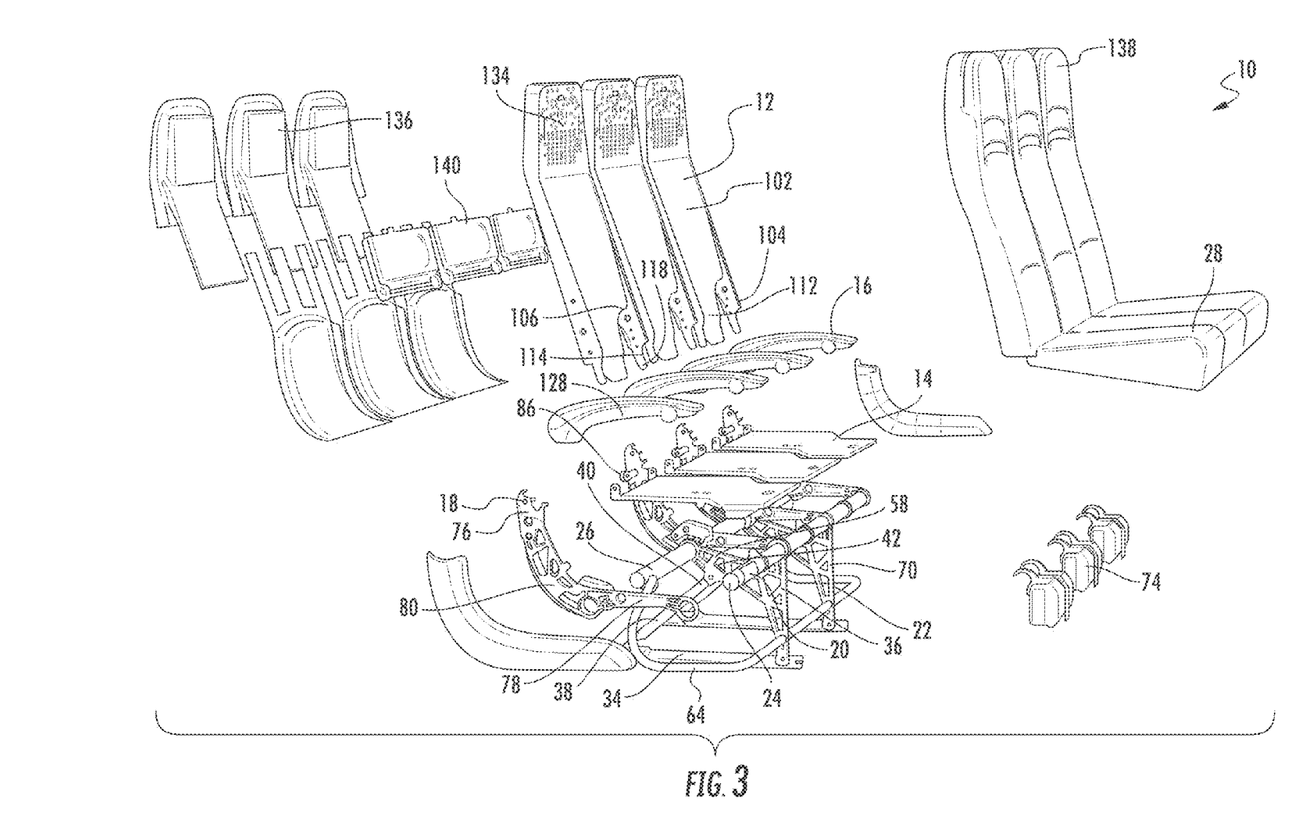
FIG. 3 is an exploded view of the passenger seat assembly of FIG. 1.

The base structure 20 is formed by a forward base frame tube 24 and an aft base frame tube 26 joined by the spreaders 18, which extend along each side of the seat pan 14. The seat pan 14 is coupled to the forward base frame tube 24 and spreaders 18, and is configured to support a bottom seat cushion 28. The seat pan 14 may be formed of materials including but not limited to aluminum, stainless steel, other metallic materials, composite materials, or other similar materials. In some embodiments, as best illustrated in FIG. 3, the seat pan 14 may have a deep contour located between the spreaders 18, which provides additional space for a thicker seat cushion 28. In other embodiments, as illustrated in FIGS. 7-9, the seat pan 14 may have a substantially planar shape that spans across the surfaces of the base frame tubes 24, 26.

Figure 7:
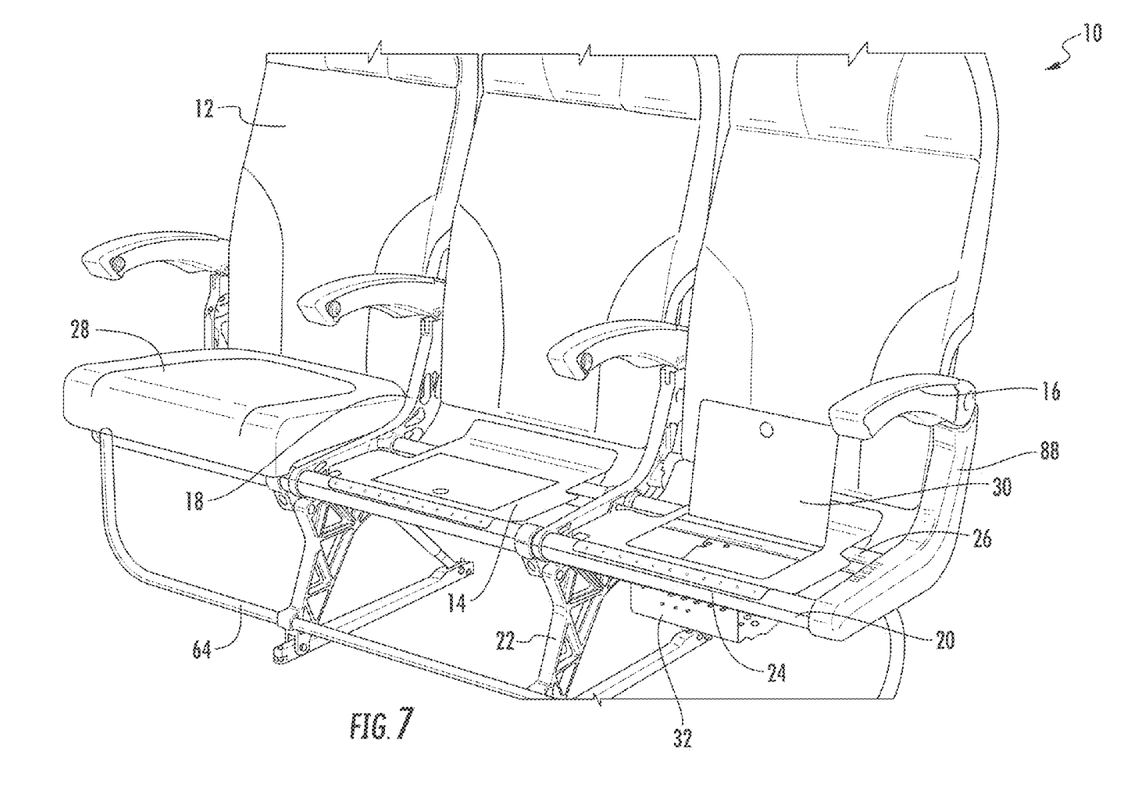
FIG. 7 is front perspective view of the passenger seat assembly of FIG. 1 showing a seat pan with a door.
Figure 8:
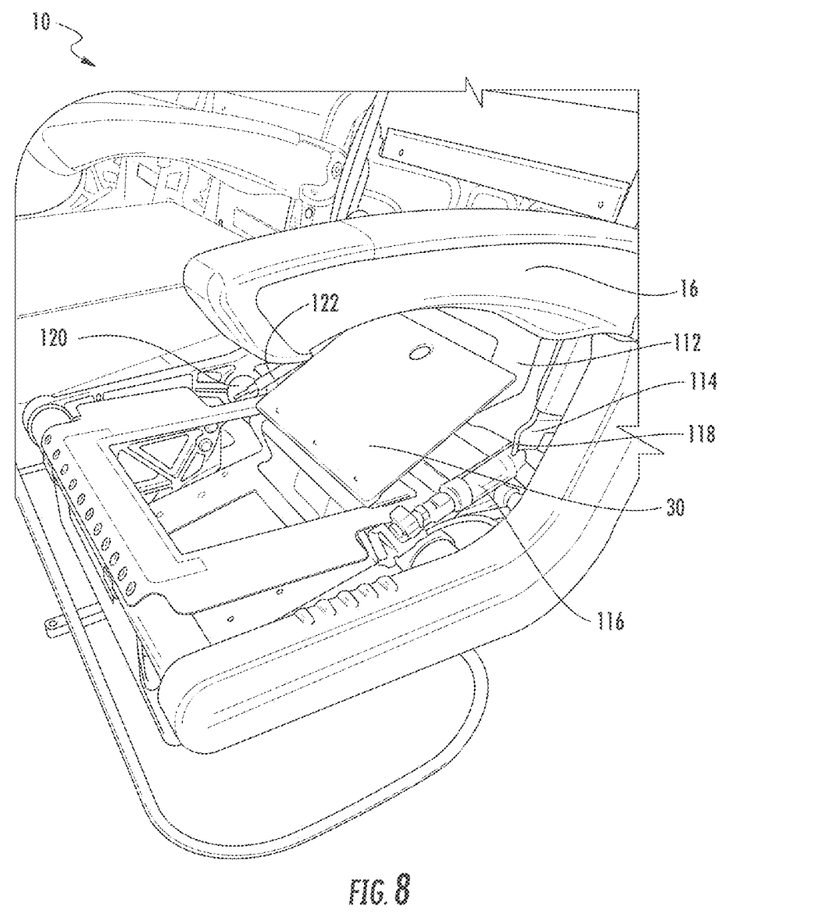
FIG. 8 is a partial perspective view of the passenger seat assembly of FIG. 7.
Figure 9:
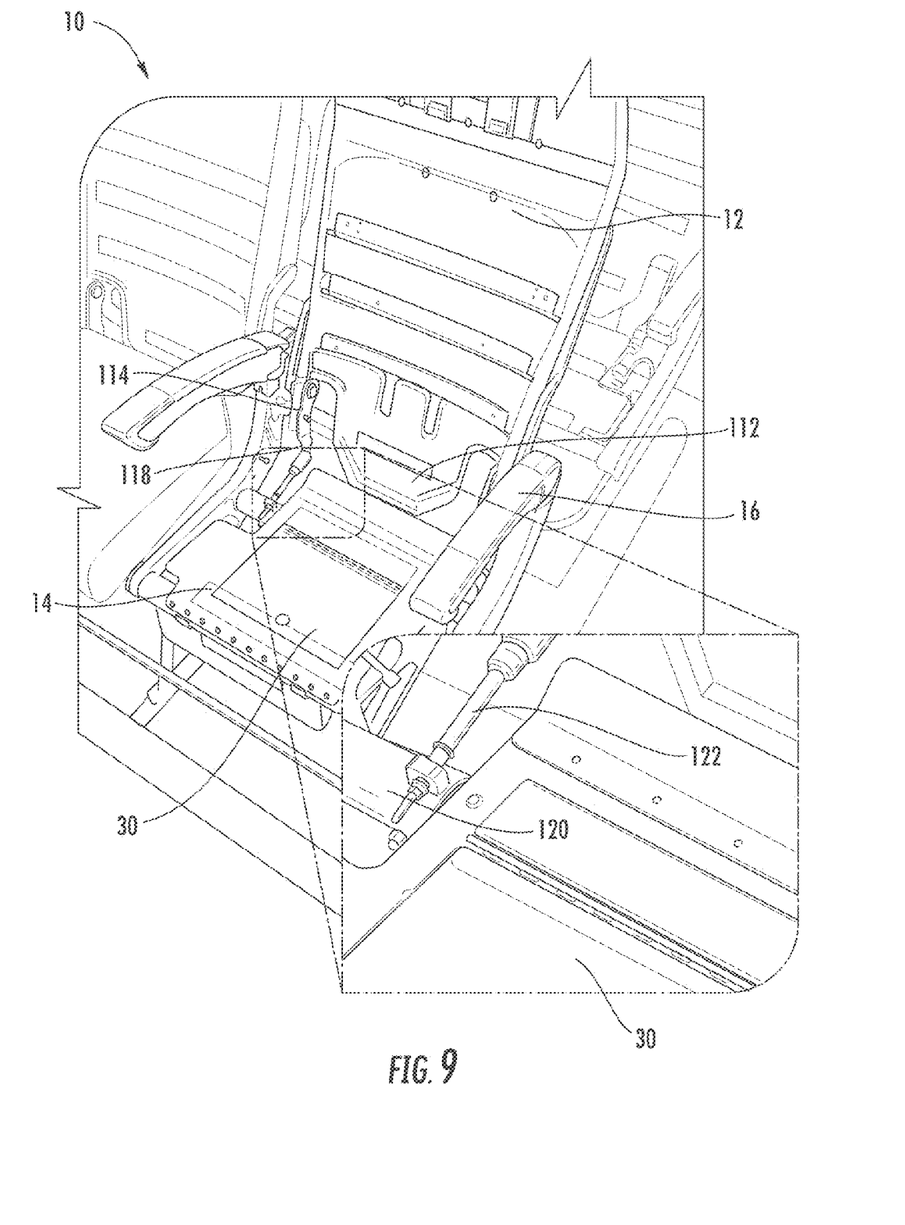
FIG. 9 another partial perspective view of the passenger seat assembly of FIG. 7.

In some embodiments, as shown in FIGS. 7-9, the seat pan 14 may comprise a door 30. The door 30 may be coupled to the seat pan 14 to provide access to In-Flight Entertainment ("IFE") equipment 32 stowed below the seat pan 14.

The base structure 20 is supported by the leg assemblies 22. Each leg assembly 22 comprises a base member 34, a forward leg portion 36, and a load-limiting strut 38. The forward leg portion 36 may be formed of aluminum, stainless steel, other metallic materials, composite materials, or other similar materials. The forward leg portion 36 may also be formed using a unitary web-like construction to provide a suitable strength to support the passenger seat assembly 10, while also minimizing the weight of the component.

An upper end 40 of the load-limiting strut 38 is coupled to an aft end 42 of the forward leg portion 36. Track fitting 44 is coupled to a lower forward end 46 of the base member 34, and track fitting 48 is coupled to a lower aft end 50 of the base member 34. The track fittings 44, 48 are configured to couple to secure the passenger seat assembly 10 to a track (not shown) mounted to the floor of a vehicle, such as a cabin floor of an aircraft or other suitable vehicle.

The load-limiting strut 38 is configured to elongate and absorb energy when the passenger seat assembly 10 pitches forward during a crash. The details of the load-limiting strut 38 and its energy-absorbing operation are shown and described in U.S. Pat. No. 5,730,492, the entire contents of which is incorporated herein by reference.

An upper end 58 of the forward leg portion 36 comprises apertures 60 through which the base frame tubes 24, 26 are inserted to couple the leg assembly 22 to the base structure 20.

Figure 1:
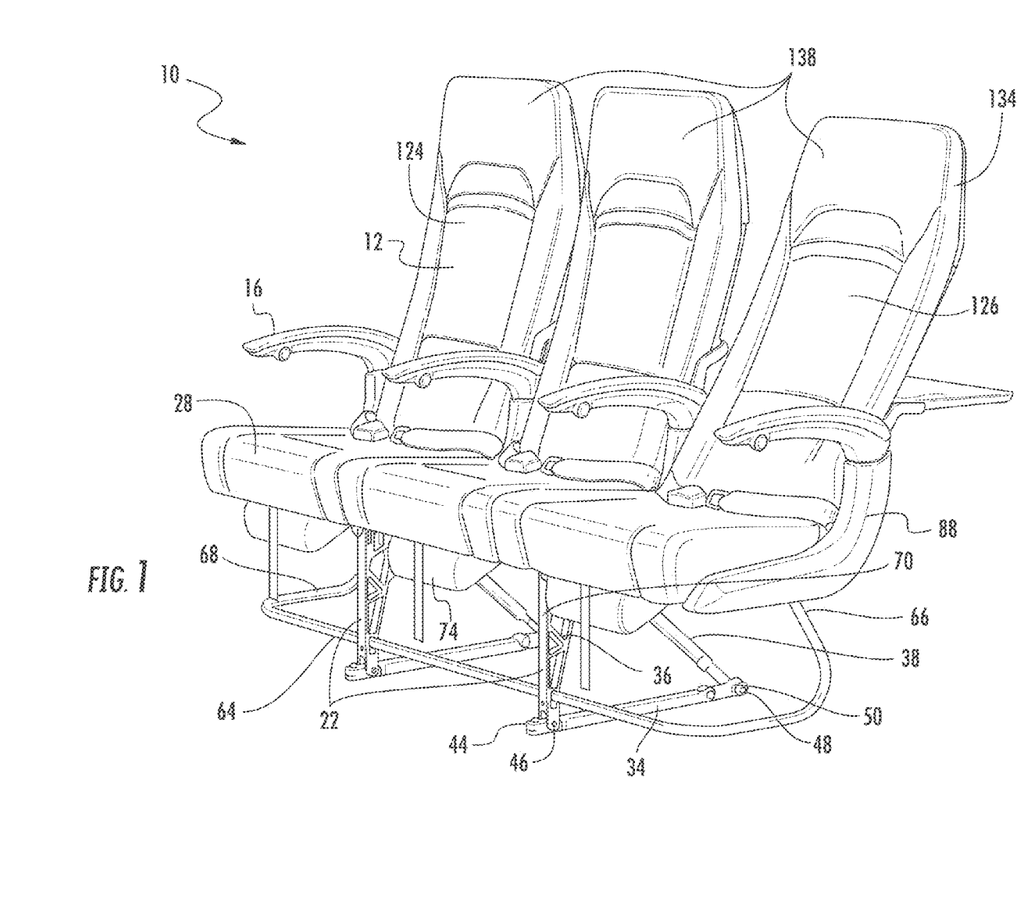
FIG. 1 is a front perspective view of a passenger seat assembly according to certain embodiments of the present invention.
Figure 2:
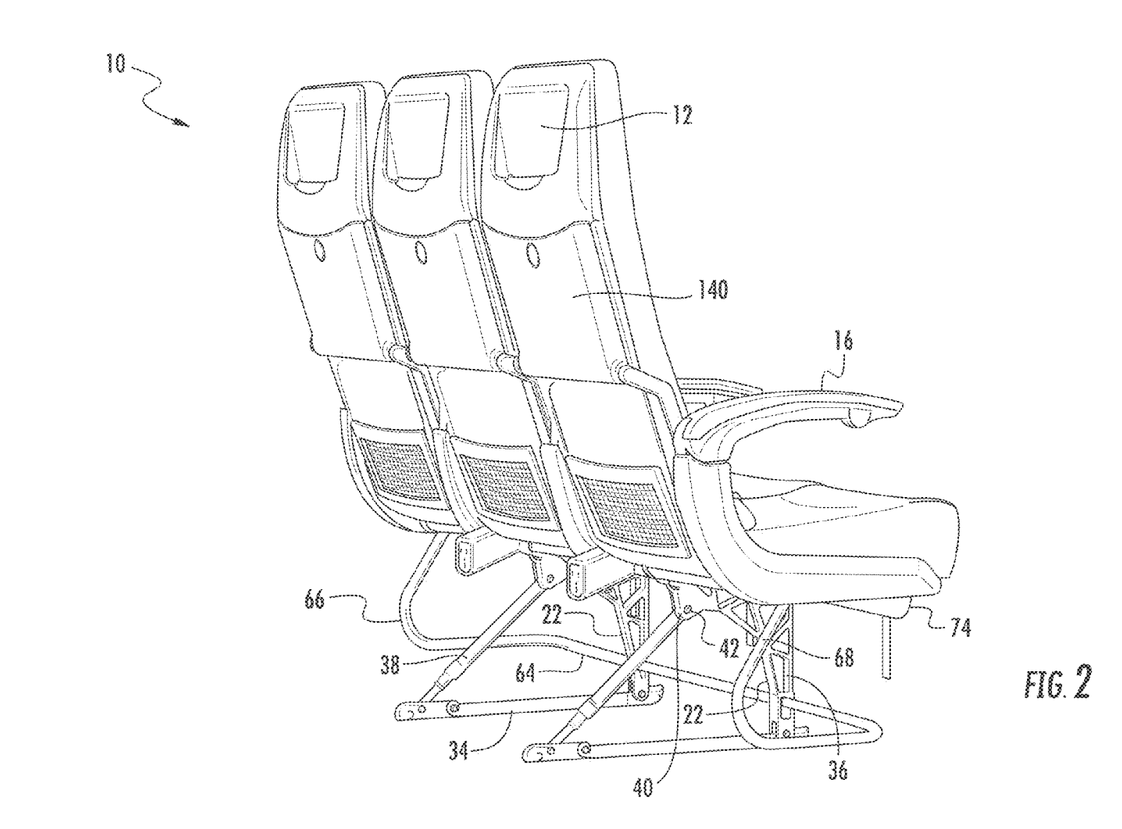
FIG. 2 is a rear view of the passenger seat assembly of FIG. 1.

The forward leg portion 36 further comprises an aperture 62 through which a stabilizing bar 64 is inserted. In certain embodiments, the stabilizing bar 64 is configured to extend the length of the base structure 20. At least one end 66 of the stabilizing bar 64 is shaped to extend in an aft direction and couple to a corresponding end of the aft base frame tube 26, as illustrated in FIGS. 1-3. A second end 68 may be shaped to couple to a second corresponding end of the aft base frame tube 26, as illustrated in FIGS. 1-3. However, one of ordinary skill in the relevant art will understand that both ends 66, 68 may be configured to couple to both ends of the forward base frame tube 24, aft base frame tube 26, a combination of both, or any other suitable location.

In the embodiments shown in FIGS. 1-5, the forward leg portion 36 is shaped to increase the amount of space available for stowage and/or a passenger's feet below the passenger seat assembly 10, as compared to the stowage/foot space provided by conventional leg assemblies. For example, in these embodiments, a forward surface 70 of the forward leg portion 36 is substantially vertical and aligned with a forward edge of the forward base frame tube 24. The upper end 58 of the forward leg portion 36 has a downward pitch in a forward direction between the base frame tubes 24, 26. As a result of these changes to the configuration of the forward surface 70 and upper end 58, an aft surface 72 of the forward leg portion 36 has an angular profile, as opposed to a linear/curvilinear profile of conventional leg assemblies, so that the aft surface 72 has a profile that substantially resembles the shape of an "r." The changes to the aft surface 72 increase the amount of potential stowage and/or foot space area below the passenger seat assembly 10 by up to about 2 inches in a forward direction, as compared to the design of the conventional passenger seat shown in FIGS. 4 and 5.

To determine the most efficient configuration of the leg assembly 22, a series of performance tests, commonly referred to as "16 g tests," were performed. An aircraft seat passes the 16 g test when the seat remains attached to an airframe after the specified force has been applied. In this case, the results of the 16 g test demonstrated that shifting the design of the forward leg portion 36 forward with respect to the base structure 20 provided sufficient structural support for the passenger seat assembly 10, while also maximizing space below the passenger seat assembly 10 and minimizing the amount of materials and weight of the component.

In some embodiments, life vest boxes 74 are coupled to the forward base frame tube 24 and positioned between the forward leg portions 36.

The spreaders 18 may be formed of aluminum, stainless steel, other metallic materials, composite materials, or other similar materials. The spreaders 18 may also be formed using a unitary web-like construction to provide a suitable strength to support the passenger seat assembly 10, while also minimizing the weight of the component. Each spreader 18 includes a substantially vertical upper portion 76 and a substantially horizontal lower portion 78. A curved transitional region 80 is located between the upper portion 76 and the lower portion 78. In some embodiments, as shown in FIGS. 3 and 6, the spreader 18 comprises apertures 82 in the lower portion 78 through which the base frame tubes 24, 26 are inserted so as to couple the spreader 18 to the base structure 20.

Figure 6:
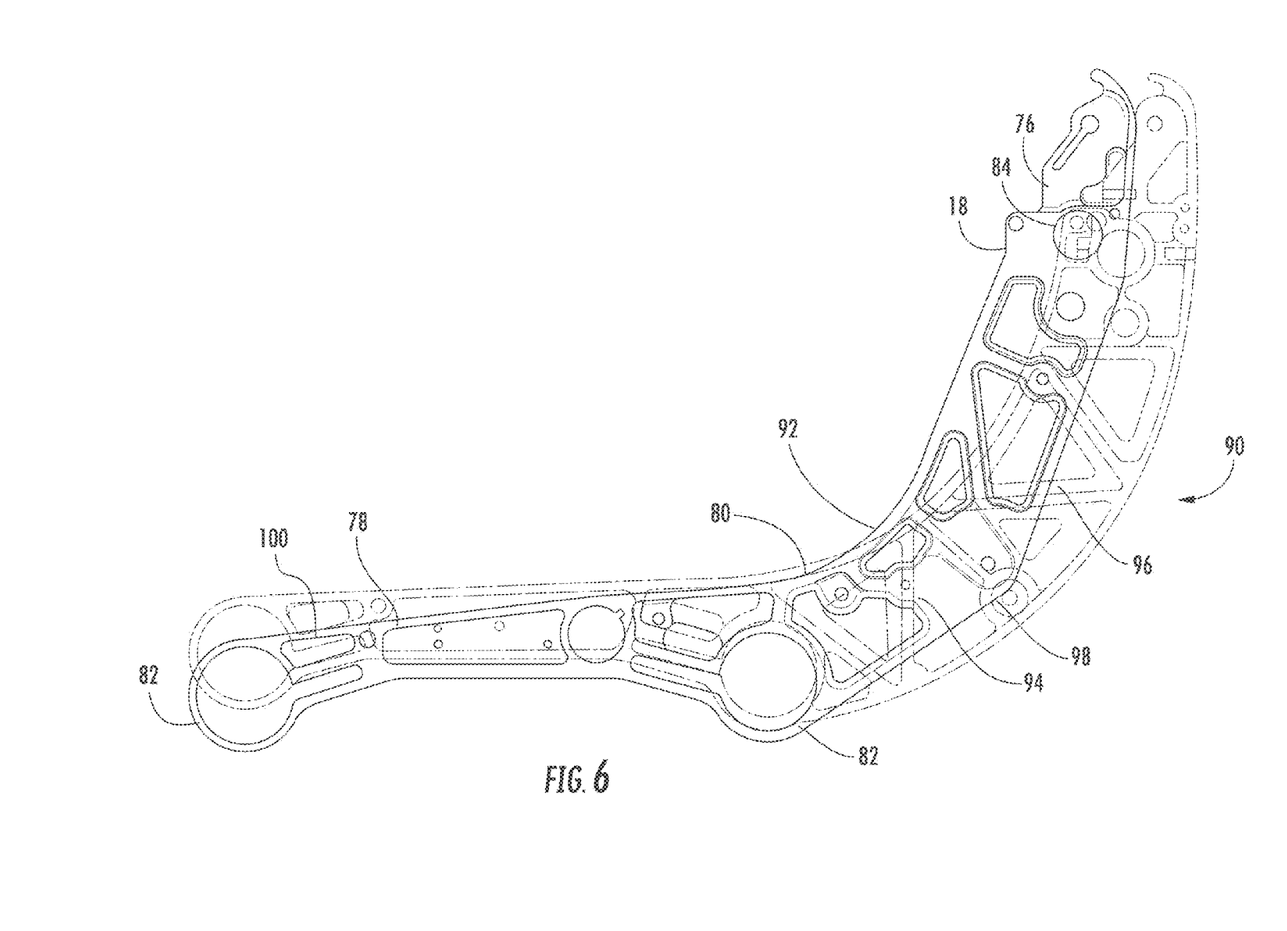
FIG. 6 is a side view of a spreader of the passenger seat assembly of FIG. 1 with an outline of a spreader of a conventional passenger seat assembly superimposed thereon and shown in broken lines.

In certain embodiments, as illustrated in FIGS. 3 and 6, the spreader 18 further comprises an aperture 84 in the upper portion 76 that is configured to couple to a pivot shaft 86, which is described in more detail below. In certain embodiments, a bumper 88 having a shape configured to substantially conform to the shape of the spreader 18 is positioned adjacent the spreader 18 located at each end of the passenger seat assembly 10.

Figure 4:
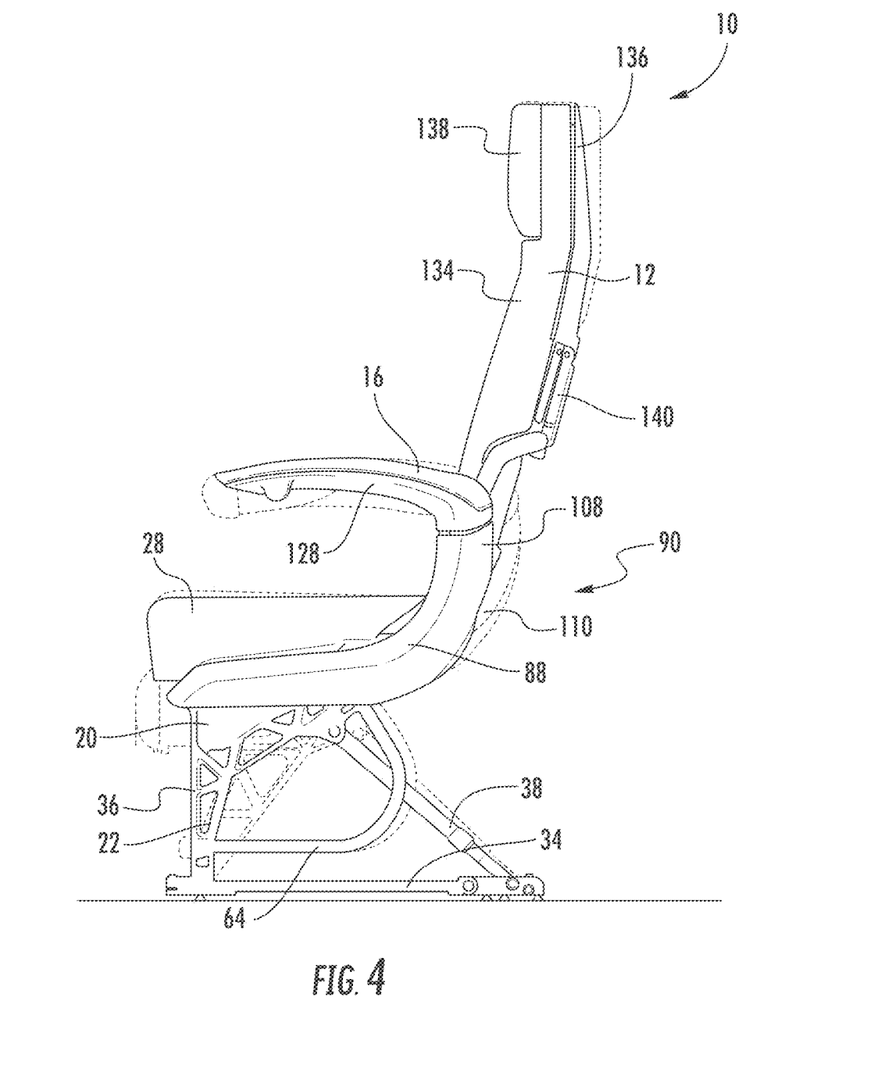
FIG. 4 is a side view of the passenger seat assembly of FIG. 1 superimposed on an outline of a conventional passenger seat assembly shown in broken lines.
Figure 5:
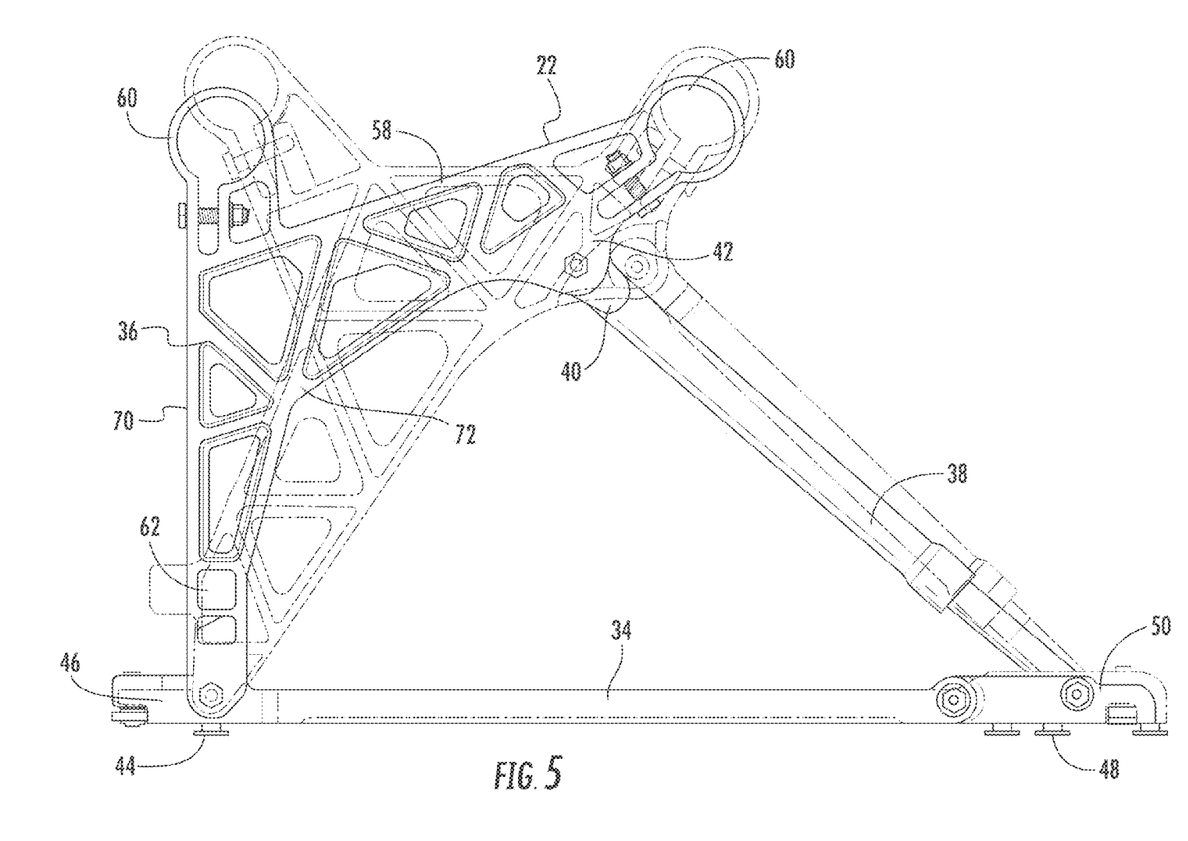
FIG. 5 is a side view of a leg assembly of the passenger seat assembly of FIG. 1 with an outline of a leg assembly of a conventional passenger seat assembly superimposed thereon and shown in broken lines.

In the embodiments shown in FIGS. 4 and 6, the spreader 18 is shaped so as to increase a knee space region 90 of the passenger seated in the next aft passenger seat assembly 10, as compared to the knee space region provided by conventional spreaders. For example, a forward surface 92 of the transitional region 80 has a radius of curvature of about 3.5-3.7 inches, which is up to about 2 to 2.2 inches less than the radius of curvature of a conventional spreader, so that a transition point 94 between the transitional region 80 and the upper portion 76 is located forward of a conventional transition point 96. In addition, an aft surface 98 of the transitional region 80 has an angular profile, as opposed to a curvilinear profile of conventional spreaders, so that the aft surface 98 is located forward of and/or substantially aligned with a plane formed by a surface of the seat back 12 in a fully upright position 124, which is described in more detail below. The changes to the inner radius of curvature of the forward surface 92 and the profile shape of the aft surface 98 increase the knee space region 90 by up to about 2 inches in a forward direction, as compared to the design of the conventional passenger seat shown in FIGS. 4 and 6.

To improve the comfort of the passenger seated in passenger seat assembly 10, the position of the forward base frame tube 24 is lowered relative to the conventional location, as illustrated in FIG. 6, so that the lower portion 78 has an upper surface 100 with a downward pitch in a forward direction. The forward/downward pitch of the upper surface 100 compensates for the smaller radius of curvature in the forward surface 92. The seat pan 14 may also be configured with a downward pitch in a forward direction that substantially aligns with the shape of the upper surface 100.

The seat back 12 may be formed of materials including but not limited to aluminum, stainless steel, other metallic materials, composite materials, or other similar materials. In some embodiments, such as the embodiments shown in FIGS. 3 and 8-9, the seat back 12 comprises a central panel 102 and a pair of extensions 104. Each extension 104 is located at a lower end 106 of the central panel 102.

In some embodiments, such as the embodiments best shown in FIG. 3, each extension 104 is configured to pivotally couple the seat back 12 to the pivot shaft 86, which is in turn coupled to the spreader 18. As illustrated in FIGS. 1 and 4, the seat back 12 pivots relative to the pivot shaft 86 at a high pivot location 108, which is located at about the same height as the arm rests 16. This high pivot location 108 is located above a traditional pivot location 110, where the traditional pivot location 110 is positioned closer to the seat pan 14. With the pivot shaft 86 located at the high pivot location 108, the seat back 12 is configured to pivot adjacent a lumbar region of a passenger's back, as opposed to the traditional pivot location 110 adjacent a pelvic region of the passenger's back. If the high pivot location 108 were used in conjunction with a traditional seat back 12, a portion of the seat back 12 located below the high pivot location 108 would intrude into a passenger's back when the seat back 12 is reclined. To avoid this intrusion, the embodiments of the seat back 12 shown in FIGS. 3 and 8-9 are configured so that a support structure 112 extends from the lower end 106 between and aft of the extensions 104.

In some embodiments, such as the embodiments best illustrated in FIGS. 3 and 8-9, a quadrant arm 114 is utilized to couple the seat back 12 to the base structure 20. In these embodiments, the quadrant arm 114 is coupled to the extension 104 via a mechanical fastener, such as a screw, bolt, rivet, or other suitable mechanical fastening device. The quadrant arm 114 may be formed of materials including but not limited to aluminum, stainless steel, other metallic materials, composite materials, or other similar materials. In some embodiments, such as the embodiments shown in FIGS. 3 and 8-9, the quadrant arm 114 has an angled shape as needed for the particular coupling arrangement between the seat back 12 and the base structure 20. In other embodiments, the quadrant arm 114 may be substantially straight.

A lower end 118 of the quadrant arm 114 may be configured to couple to a recline lock 116. In these embodiments, the recline lock 116 is positioned between the seat pan 14 and the spreader 18. In other embodiments, the recline lock 116 may be centrally positioned aft of or below the seat pan 14. One of ordinary skill in the relevant art will understand that any suitable location for the recline lock 116 may be used.

In some embodiments, the quadrant arm 114 may be coupled to the lower end 106 of the seat back 12, where the seat back 12 does not include the extension 104. In other embodiments, the extension 104 may be elongated to couple to the recline lock 116 directly without the use of the quadrant arm 114. One of ordinary skill in the relevant art will understand that any suitable combination of the quadrant arm 114 and/or the extension 104 may be used to couple the seat back 12 to the recline lock 116. The recline lock 116 may be a locking gas spring. In some embodiments, as illustrated in FIGS. 8-9, the recline lock 116 may be coupled directly to the spreader 18 through the use of a trunnion 120. In other embodiments, the recline lock 116 may be coupled to the aft base frame tube 26.

A strut assembly 122 may be used to limit deflection of the seat back 12 in some embodiments, depending on the composition and torsion resistance of the seat back 12. The amount of torsion resistance of the seat back 12 is measured in a Head-Impact-Criteria (HIC) test that uses an anthropometric test dummy ("ATD") in the 16 g test crash of passenger seat assemblies 10 in series. When the ATD hits one of the passenger seat assemblies 10, the seat back 12 may twist in some instances when the seat back 12 is fixed on one side (i.e., where the seat back 12 is coupled to the recline lock 116).

In the embodiments where the recline lock 116 is centrally located relative to the seat pan 14, the use of a strut assembly 122 may be unnecessary or two strut assemblies 122 may be needed on either side of the recline lock 116, depending on the composition and torsion resistance of the seat back 12. One of ordinary skill in the relevant art will understand that any suitable location and number of the strut assemblies 122 may be used. In other embodiments, a stiffer material may be used to form the seat back 12 or a torsion tube may be used so that the strut assembly 122 is not required.

In some embodiments where the strut assembly 122 is used, such as the embodiments best illustrated in FIGS. 8-9, another quadrant arm 114 and/or another extension 104 may be included to couple the seat back 12 to the strut assembly 122. One of ordinary skill in the relevant art will understand that the total number of the additional quadrant arms 114 and/or additional extensions 104 used, as well as their position, may depend on the number of the strut assemblies 122 used and their positions.

The strut assembly 122 is configured to have the exact stroke as the recline lock 116. Thus, when the seat back 12 is reclined, the strut assembly 122 and the recline lock 116 stop simultaneously, thus providing a rigid support for a fully upright position 124 and a fully reclined position 126 of the passenger seat assembly 10, as shown in FIG. 1.

Furthermore, by locating the pivot shaft 86 in the high pivot location 108, as opposed to the traditional pivot location 110, the seat back 12 provides additional comfort to the passenger seated in the passenger seat assembly 10 by allowing some recline from the fully upright position 124 without impeding the knee space region 90 of the passenger seated aft of the passenger seat assembly 10.

Figure 10:
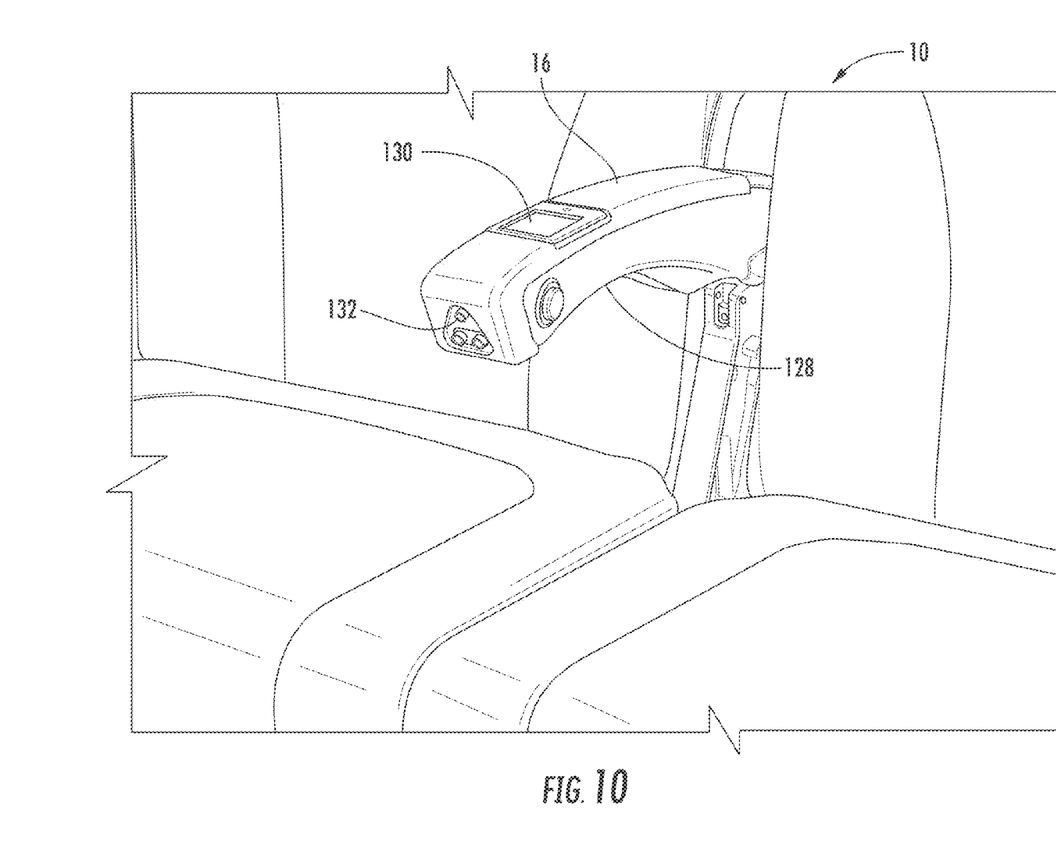
FIG. 10 is a partial perspective view of an arm rest of the passenger seat assembly of FIG. 1.

As best illustrated in FIGS. 3-4, each arm rest 16 is coupled to the upper portion 76 of the spreader 18 adjacent the location of the aperture 84 where the seat back 12 is pivotally coupled to the spreaders 18. A lower surface 128 of each arm rest 16 is shaped to taper upward in a forward direction. The tapered shape of the arm rest 16 increases the amount of space available below the arm rests 16 for a passenger's legs, as opposed to conventional arm rest shapes illustrated in FIG. 4. The tapered shape of the arm rest 16 also smooths the transition to the front edge of the arm rest 16, which also improves the comfort of the arm rest 16 when the lower surface 128 contacts a passenger's leg. As illustrated in FIG. 10, the arm rest 16 may include power control units ("PCUs") 130 to connect personal electronic devices to the IFE so that a passenger may utilize the IFE equipment 32 to view and/or listen to items stored on the personal electronic devices. The arm rest 16 may also include remote jack units ("RJUs") 132, which may be a small footprint headphone connector. The RJUs 132 may provide a cost effective means of connecting active noise cancellation headphones. The PCUs 130 and RJUs 132 may be integrated into the arm rest 16 in a compact arrangement, as illustrated in FIG. 10.

The seat back 12 profile is shaped to taper to a smaller thickness at an upper end 134 of the seat back 12. The thinner profile may be accomplished through a smaller thickness of the seat back 12 adjacent the upper end 134 and/or through use of a thinner shroud 136 adjacent the upper end 134. A slim profile tray table 140 may be used in conjunction with the slim seat back 12 profile to further improve the amount of space available to a passenger seated aft of the passenger seat assembly 10.

The seat back 12 may also be equipped with an adjustable headrest 138, wherein the headrest 138 may be configured to provide adjustable side support, as well as vertical adjustment to accommodate passengers of different heights.

The foregoing is provided for purposes of illustrating, explaining, and describing embodiments of the present invention. Further modifications and adaptations to these embodiments will be apparent to those skilled in the art and may be made without departing from the scope or spirit of the invention.

That which is claimed is:

1. A passenger seat assembly comprising a plurality of passenger seats, wherein the passenger seat assembly comprises:
a plurality of spreaders, each spreader comprising an upper portion and a lower portion separated by a transitional region;
a plurality of seat backs, each seat back comprising a central panel and a pair of extensions coupled to a lower end of the central panel, wherein the pair of extensions are pivotally coupled to the upper portions of two of the plurality of spreaders;
a base structure comprising a forward base frame tube and an aft base frame tube, wherein the forward base frame tube and the aft base frame tube pass through a pair of apertures in the lower portion of each spreader; and
at least two leg assemblies, each leg assembly comprising a forward leg portion, wherein the forward base frame tube and the aft base frame tube pass through a pair of apertures in the forward leg portion,
wherein an upper end of the forward leg portion of each leg assembly has a downward pitch in a forward direction between the aft base frame tube and the forward base frame tube such that the forward base frame tube is located at a lower height than the aft base frame tube.

2. The passenger seat assembly of claim 1, wherein the transitional region of each spreader comprises a forward surface having a radius of curvature of about 3.5 to 3.7 inches and an aft surface having an angular profile configured so that the aft surface is located forward of a plane formed by a surface of each seat back in a fully upright position.

3. The passenger seat assembly of claim 1, wherein an upper surface of the lower portion of each spreader has a downward pitch in a forward direction between the aft base frame tube and the forward base frame tube.

4. The passenger seat assembly of claim 1, further comprising a plurality of arm rests coupled to the upper portions of the plurality of spreaders, wherein each seat back is configured to pivot relative to two of the plurality of spreaders adjacent the location where each arm rest is coupled to the upper portion of each spreader.

5. The passenger seat assembly of claim 1, further comprising a plurality of seat pans, each seat pan positioned over the forward base frame tube and the aft base frame tube.

6. The passenger seat assembly of claim 5, wherein each seat pan is configured with a downward pitch in a forward direction between the aft base frame tube and the forward base frame tube.

7. The passenger seat assembly of claim 6, wherein each seat pan comprises a door that provides access to an In-Flight Entertainment equipment stowed below each seat pan.

8. A passenger seat assembly comprising a plurality of passenger seats, wherein the passenger seat assembly comprises:
a plurality of spreaders, each spreader comprising an upper portion and a lower portion separated by a transitional region;
a base structure comprising a forward base frame tube and an aft base frame tube, wherein the forward base frame tube and the aft base frame tube pass through a pair of apertures in the lower portion of each spreader; and
at least two leg assemblies, each leg assembly comprising a forward leg portion, wherein the forward base frame tube and the aft base frame tube pass through a pair of apertures in the forward leg portion, wherein an upper surface of the lower portion of each spreader has a downward pitch in a forward direction between the aft base frame tube and the forward base frame tube such that the forward base frame tube is located at a lower height than the aft base frame tube.

9. The passenger seat assembly of claim 8, further comprising:
a plurality of seat backs, each seat back comprising a central panel and a pair of extensions coupled to a lower end of the central panel, wherein the pair of extensions are pivotally coupled to the upper portions of two of the plurality of spreaders; and
a plurality of arm rests coupled to the upper portions of the plurality of spreaders, wherein each seat back is configured to pivot relative to two of the plurality of spreaders adjacent the location where each arm rest is coupled to the upper portion of each spreader.

10. The passenger seat assembly of claim 8, wherein each leg assembly further comprises a load-limiting strut.

11. The passenger seat assembly of claim 8, wherein the transitional region of each spreader comprises a forward surface having a radius of curvature of about 3.5 to 3.7 inches and an aft surface having an angular profile configured so that the aft surface is located forward of a plane formed by a surface of each seat back in a fully upright position.

12. The passenger seat assembly of claim 8, further comprising a plurality of seat pans, each seat pan positioned over the forward base frame tube and the aft base frame tube.

13. The passenger seat assembly of claim 12, wherein each seat pan comprises a deep contour located between two of the plurality of spreaders, and wherein each seat pan is configured with a downward pitch in a forward direction between the aft base frame tube and the forward base frame tube.

14. The passenger seat assembly of claim 12, wherein each seat pan comprises a door that provides access to an In-Flight Entertainment equipment stowed below each seat pan.

15. The passenger seat assembly of claim 8, wherein an upper end of the forward leg portion of each leg assembly has a downward pitch in a forward direction between the aft base frame tube and the forward base frame tube.

16. A passenger seat assembly comprising a plurality of passenger seats, wherein the passenger seat assembly comprises:
a base structure comprising a forward base frame tube and an aft base frame tube; and
at least two leg assemblies, each leg assembly comprising a forward leg portion, wherein the forward base frame tube and the aft base frame tube pass through a pair of apertures in the forward leg portion,
wherein an upper end of each leg assembly has a downward pitch in a forward direction between the aft base frame tube and the forward base frame tube such that the forward base frame tube is located at a lower height than the aft base frame tube.

17. The passenger seat assembly of claim 16, wherein each leg assembly further comprises a load-limiting strut.

18. The passenger seat assembly of claim 16, further comprising:
a plurality of spreaders, each spreader comprising an upper portion and a lower portion separated by a transitional region,
wherein the forward base frame tube and the aft base frame tube pass through a pair of apertures in the lower portion of each spreader,
wherein the transitional region of each spreader comprises a forward surface having a radius of curvature of about 3.5 to 3.7 inches and an aft surface having an angular profile configured so that the aft surface is located forward of a plane formed by a surface of each seat back in a fully upright position, and
wherein an upper surface of the lower portion of each spreader has a downward pitch in a forward direction between the aft base frame tube and the forward base frame tube such that the forward base frame tube is located at a lower height than the aft base frame tube.

19. The passenger seat assembly of claim 18, wherein a forward surface of the forward leg portion is substantially aligned with a forward edge of the forward base frame tube, and an aft surface of the forward leg portion comprises an angular profile having a shape of an "r".

20. The passenger seat assembly of claim 16, wherein each seat pan comprises a door that provides access to an In-Flight Entertainment equipment stowed below each seat pan.

* * * * *

UNITED STATES PATENT AND TRADEMARK OFFICE
CERTIFICATE OF CORRECTION

| | |
|---|---|
| PATENT NO. | : 10,214,127 B2 |
| APPLICATION NO. | : 15/597622 |
| DATED | : February 26, 2019 |
| INVENTOR(S) | : Jeffrey P. Wegenka et al. |

Page 1 of 1

It is certified that error appears in the above-identified patent and that said Letters Patent is hereby corrected as shown below:

On the Title Page

Item [72], insert -- Shreyas Krishna, Denton, TX (US) --

Signed and Sealed this
Seventh Day of May, 2019

Andrei Iancu
*Director of the United States Patent and Trademark Office*